United States Patent
Gao et al.

(10) Patent No.: US 10,701,134 B2
(45) Date of Patent: *Jun. 30, 2020

(54) TRANSFERRING DATA BETWEEN BLOCK AND FILE STORAGE SYSTEMS

(71) Applicant: International Business Machines Corporation, Armonk, NY (US)

(72) Inventors: Xue Dong Gao, Shanghai (CN); Karl A. Nielsen, Tucson, AZ (US); Yao Peng, Shanghai (CN); Brian A. Rinaldi, Tucson, AZ (US); Tang Ren Yao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,079

(22) Filed: Oct. 17, 2018

(65) Prior Publication Data
US 2019/0052698 A1  Feb. 14, 2019

Related U.S. Application Data

(63) Continuation of application No. 15/338,642, filed on Oct. 31, 2016, now Pat. No. 10,257,258.

(51) Int. Cl.
*H04L 29/08* (2006.01)
*G06F 3/06* (2006.01)
*G06F 11/14* (2006.01)

(52) U.S. Cl.
CPC ............ *H04L 67/06* (2013.01); *G06F 3/0604* (2013.01); *G06F 3/064* (2013.01); *G06F 3/067* (2013.01);
(Continued)

(58) Field of Classification Search
None
See application file for complete search history.

(56) References Cited

U.S. PATENT DOCUMENTS 6,446,175 B1  9/2002  West et al.
6,715,048 B1  3/2004  Kamvysselis
(Continued)

FOREIGN PATENT DOCUMENTS

JP   2008287675 A   11/2008

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.
(Continued)

*Primary Examiner* — Davoud A Zand
(74) *Attorney, Agent, or Firm* — Kelli D. Morin

(57) ABSTRACT

Provided is a method, computer program product, and system for transferring data between block and file storage systems. A remote server may receive, from a host device, a request to restore data to the host device. The remote server may store the data as one or more objects, with each object corresponding to an extent of a logical volume on the host device. A set of strides on the host device that correspond to the one or more objects may be determined using metadata for the one or more objects. Each of the one or more objects may be split into a set of data pieces using the metadata. Each data piece may then be transmitted from the remote server to the host device.

20 Claims, 10 Drawing Sheets

(52) U.S. Cl.
CPC .......... *G06F 3/0607* (2013.01); *G06F 3/0643* (2013.01); *G06F 3/0647* (2013.01); *G06F 3/0659* (2013.01); *G06F 3/0661* (2013.01); *G06F 3/0665* (2013.01); *G06F 11/1446* (2013.01); *G06F 11/1451* (2013.01); *H04L 67/1097* (2013.01)

(56) References Cited

U.S. PATENT DOCUMENTS

| | | | |
|---|---|---|---|
| 7,284,104 | B1 | 10/2007 | Wu et al. |
| 7,353,352 | B2 | 4/2008 | Nishimura et al. |
| 7,634,627 | B1 | 12/2009 | Ohr et al. |
| 8,200,638 | B1 | 6/2012 | Zheng et al. |
| 8,205,049 | B1 | 6/2012 | Armangau et al. |
| 8,266,325 | B2 * | 9/2012 | Benhase ............... G06F 3/0608 707/747 |
| 8,315,985 | B1 | 11/2012 | Ohr et al. |
| 8,341,199 | B2 | 12/2012 | Fujimoto |
| 8,352,691 | B2 * | 1/2013 | Grusy ................. G06F 12/0804 711/156 |
| 8,635,429 | B1 | 1/2014 | Naftel et al. |
| 8,738,880 | B2 * | 5/2014 | Grusy .................... G06F 3/061 711/170 |
| 8,914,597 | B2 | 12/2014 | Benhase et al. |
| 8,918,607 | B2 | 12/2014 | Benhase et al. |
| 9,128,973 | B1 | 9/2015 | Murugesan et al. |
| 9,513,999 | B2 | 12/2016 | Singh et al. |
| 10,063,624 | B2 | 8/2018 | Gao et al. |
| 2003/0074527 | A1 | 4/2003 | Burton et al. |
| 2010/0023561 | A1 | 1/2010 | Zlotnick |
| 2012/0131293 | A1 * | 5/2012 | Benhase ................ G06F 3/065 711/162 |
| 2012/0198150 | A1 | 8/2012 | Benhase et al. |
| 2013/0036128 | A1 | 2/2013 | Ben-Tsion et al. |
| 2013/0080391 | A1 | 3/2013 | Raichstein et al. |
| 2013/0159646 | A1 | 6/2013 | Atzmon et al. |
| 2013/0205109 | A1 | 8/2013 | Benhase et al. |
| 2014/0006357 | A1 | 1/2014 | Davis et al. |
| 2014/0208018 | A1 | 7/2014 | Benhase et al. |
| 2014/0208024 | A1 | 7/2014 | Simionescu et al. |
| 2014/0344526 | A1 | 11/2014 | Brown et al. |
| 2014/0372384 | A1 | 12/2014 | Long et al. |
| 2014/0380128 | A1 | 12/2014 | Baptist et al. |
| 2015/0269032 | A1 | 9/2015 | Muthyala et al. |
| 2015/0301930 | A1 | 10/2015 | Bruner et al. |
| 2016/0011943 | A1 | 1/2016 | Chen et al. |
| 2016/0117318 | A1 | 4/2016 | Helland |
| 2016/0132529 | A1 | 6/2016 | Acharya |
| 2016/0170844 | A1 | 6/2016 | Long et al. |
| 2017/0115928 | A1 | 4/2017 | Chen et al. |
| 2017/0139609 | A1 | 5/2017 | Basham et al. |
| 2017/0206221 | A1 | 7/2017 | Kumarasamy et al. |
| 2017/0220423 | A1 | 8/2017 | Binford et al. |
| 2017/0262347 | A1 | 9/2017 | Dornemann |
| 2017/0262350 | A1 | 9/2017 | Dornemann |
| 2017/0286442 | A1 | 10/2017 | Xie et al. |
| 2018/0124152 | A1 | 5/2018 | Gao et al. |

OTHER PUBLICATIONS

Accelerated Examination Support Document, U.S. Appl. No. 15/843,167, dated Nov. 21, 2017, 23 pgs.

List of IBM Patents or Patent Applications Treated as Related, Oct. 17, 2018, 2 pgs.

* cited by examiner

TRANSFERRING DATA BETWEEN BLOCK AND FILE STORAGE SYSTEMS

BACKGROUND

The present disclosure relates generally to the field of computer storage, and more particularly to transferring data between block and file storage systems.

Computers can store data using various architectures. For example, some computer systems store data using file-level storage, also referred to as file-based storage, using a file-system. Other computer systems store data using block-level storage, where data is stored in chunks (e.g., blocks), and the application using the data is responsible for combining the blocks. Data stored on a computer system may be transferred to a different server (e.g., to a cloud-based server) for processing (e.g., to perform analytics).

SUMMARY

Embodiments of the present disclosure include a method, computer program product, and system for transferring data between block and file storage systems. A remote server may receive, from a host device, a request to restore data to the host device. The remote server may store the data as one or more objects, with each object corresponding to an extent of a logical volume on the host device. A set of strides on the host device that correspond to the one or more objects may be determined using metadata for the one or more objects. Each of the one or more objects may be split into a set of data pieces using the metadata. Each data piece may correspond to a stride in the set of strides. Each data piece may then be transmitted from the remote server to the host device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
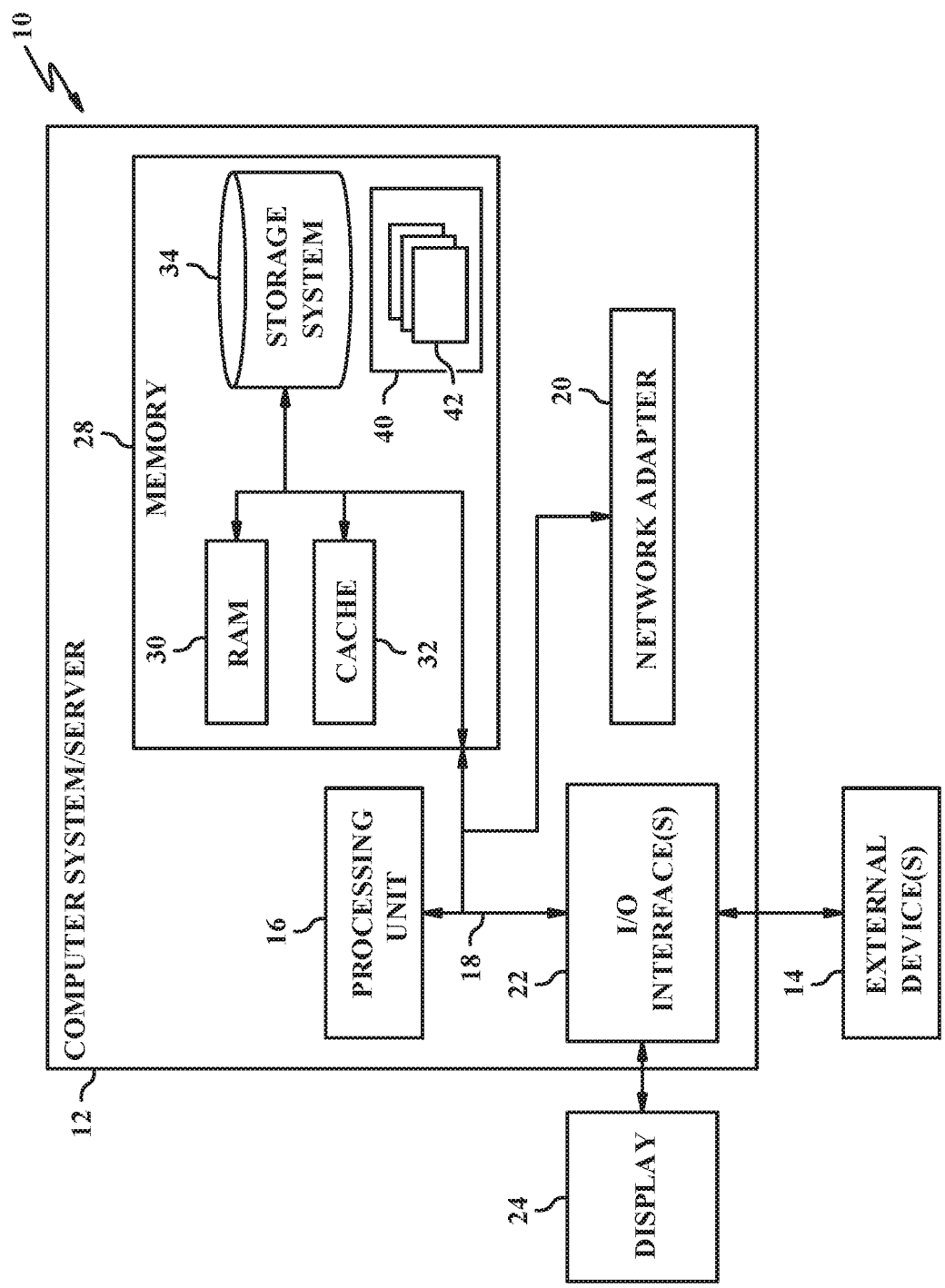
FIG. 1 depicts a cloud computing node according to an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer storage, and in particular to transferring data between block and file storage systems. While the present disclosure is not necessarily limited to such applications, various aspects of the disclosure may be appreciated through a discussion of various examples using this context.

As the amount of data generated increases, more and more applications require data sharing from different storage subsystems. Often, the data is stored on one storage subsystem in one form (e.g., using block storage). The storage subsystem that the data needs to be shared with, however, may utilize a different storage technique (e.g., file based storage). Different kinds of storage container (e.g., cloud container, block storage, etc.) have different benefits. For example, low cost storage systems for archiving or data protection often use file/Object based storage, such as Cloud, IC store, Tape LTO (LTFS), etc.

Embodiments of the present disclosure include a method, computer program product, and system for transferring data between block and file storage systems. A processor may receive a request to transmit a logical volume to a remote server. The logical volume may be stored in a data storage subsystem that includes one or more ranks. Each rank may include one or more extents, which may include one or more stride. The processor may determine an extent of the one or more extents that includes data of the logical volume. The processor may determine a set of strides associated with the extent. The processor may copy the set of strides into a stride buffer and combine the set of strides into a block extent file. The processor may transmit the block extent file to the remote server.

Cloud gateways often use extra services to read data from storage side into cloud storage. This often impacts the normal storage IO such that, when IO is heavy to storage side, the cloud gateway can cause negative performance issues in the storage system. Various embodiments of the methods and systems described herein use a storage backend transformer which is below cache. This may lessen the impact the storage transfer has on host IO (e.g., by lowering the host I/O bandwidth usage). In other words, in various embodiments, the methods described herein may be performed by logic (e.g., software executed on a processing circuit or hardware logic) at or below the storage cache level (e.g., at the stage/destage level) on the storage sub-system. This may be particularly advantageous in that it may allow the data to be transferred and/or copied at higher speed and with a smaller impact on storage I/O bandwidth when compared to having a host server or the remote server perform data copy and transfer operations. In some embodiments, the storage side data transformer may be integrated with storage side function like easy tier technology to get further IO benefits and utilize cloud tiering technology.

It is to be understood that the aforementioned advantages are example advantages and should not be construed as limiting. Embodiments of the present disclosure can contain all, some, or none of the aforementioned advantages while remaining within the spirit and scope of the present disclosure.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
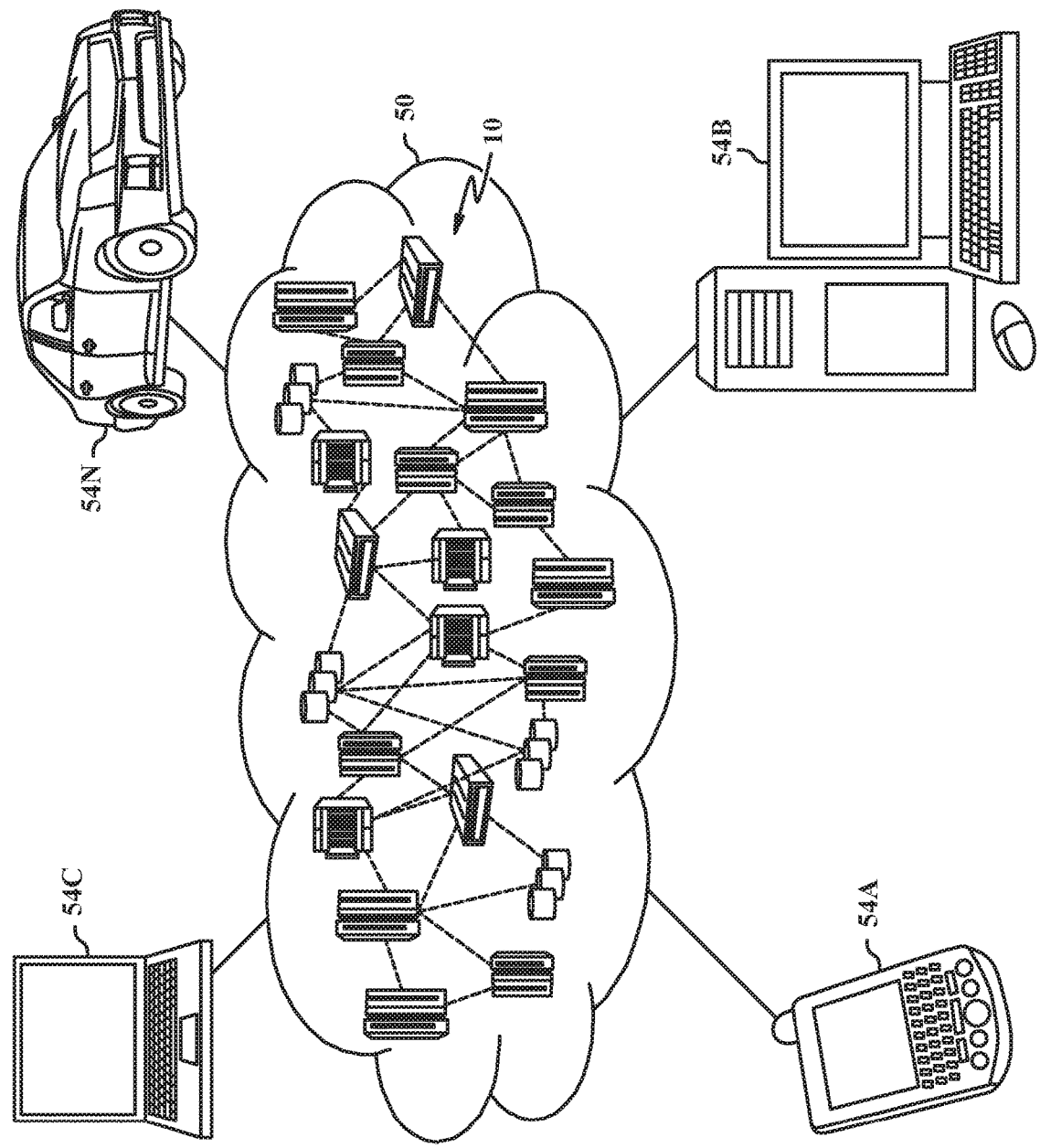
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
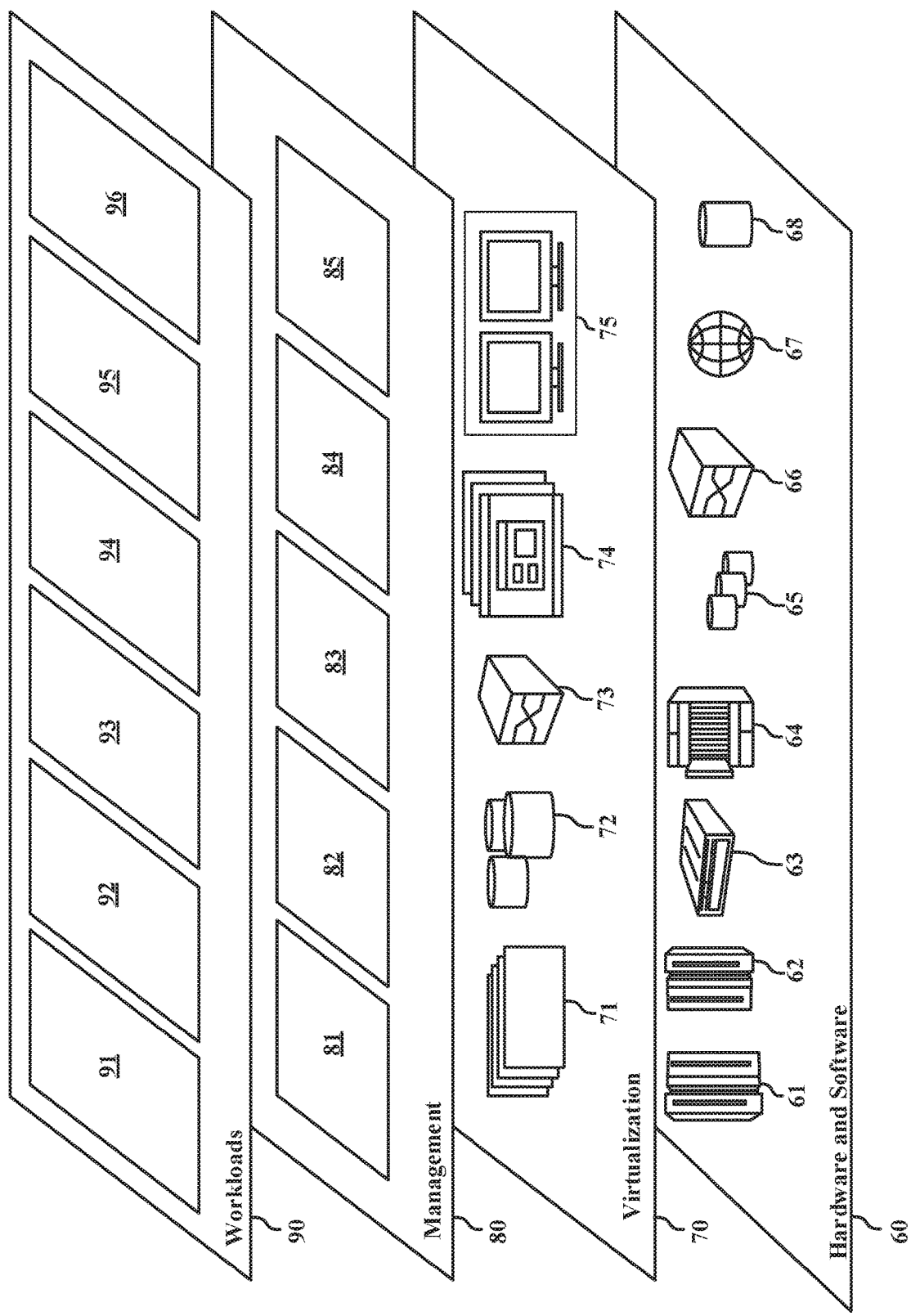
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

Figure 4:
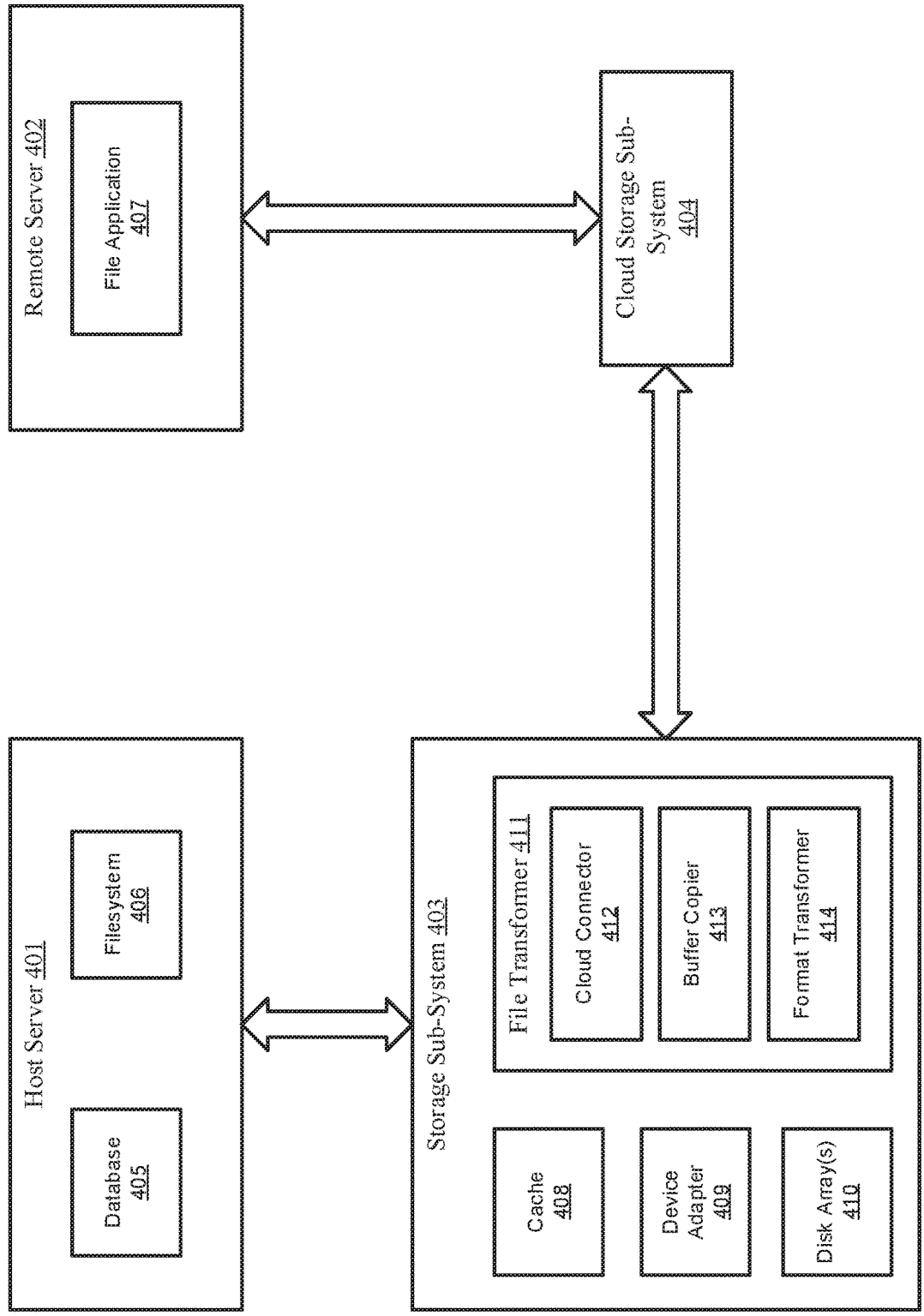
FIG. 4 depicts an example computing environment in which illustrative embodiments of the present disclosure may be implemented.

Referring now to FIG. 4, shown is an example computing environment 400 in which illustrative embodiments of the present disclosure may be implemented. The example computing environment 400 may include two servers: a first sever 401 and a remote server 402. The first and remote servers 401 and 402 may be computer systems, such as the computer system 12 shown in FIG. 1. The computing environment 400 may also include a storage subsystem 403 that may store data for the host server 401 and a cloud storage subsystem 404 that may store data for the remote server 402.

The host server 401 may include a database application 405 and a file application 406. The database application 405 may be configured to generate, retrieve, manipulate, and/or store data using block-level storage, for example. Likewise, the file application 406 may be configured to generate, retrieve, manipulate, and/or store data using file-based storage, for example, using a filesystem. The host server 401 may be communicatively coupled to the storage subsystem 403.

The storage subsystem 403 may store the data used by the database application 405 and/or the file application 406. In some embodiments, the storage subsystem 403 may be a locally attached device that is part of the host server 401 (e.g., a direct-attached storage device in the same computer chassis or enclosure). In other embodiments, the storage subsystem 403 may be a distinct computing device such as a storage area network (SAN) device or network-attached storage (NAS) device. In some embodiments, the storage subsystem 403 may include both block-level data (e.g., for use by the database application 405) and file-based data (e.g., using the filesystem 406). In embodiments where the storage subsystem 403 is a SAN device with a filesystem installed on it, the storage subsystem 403 may be referred to as a shared-disk file system.

The storage subsystem 403 may include a cache 408, a device adapter 409, one or more disk arrays 410, and a file transformer 411. The cache 408 may store data that is being sent to or from the host server 401 (e.g., between the host server 401 and the disk array(s) 410). The disk array(s) 410 may be redundant array of independent disks (RAID) arrays that provide the physical storage for the host server's 401 data. The device adapter 409 may provide logic for staging and destaging data being transferred from the disk array(s) 410 to the host server 401 or to the file transformer 411.

The file transformer 411 may transform the data for use by the remote server 402 and transmit the data. The file transformer 411 may include a cloud connector 412, a buffer copier 413, and a format transformer 414. The cloud connector 412 may be a software or hardware component that manages the cloud connection (e.g., the connection between the storage subsystem 403 and the cloud container 404) and the cloud data interface control. The buffer copier 413, also referred to herein as the stride buffer, may be a buffer used to copy/read/write the data between the storage subsystem 403 and the cloud container (e.g., cloud storage subsystem 404). The format transformer 414 may be a software or hardware component that includes logic for transforming the data before it is transmitted to the cloud container. For example, the format transformer 414 may control the mapping from arrays/strides into cloud objects/files. The format transformer may include logic to perform methods 500 and 800, shown in FIGS. 5 and 8, respectively.

The storage subsystem 403 may be communicatively coupled with the cloud storage subsystem 404. After transforming the data to a format used by the remote server (e.g., used by the file application 407), the storage subsystem 403 may transmit the data to the cloud storage subsystem 404, where the data may be written to physical devices and accessed by the remote server 402.

In some embodiments, various components shown in FIG. 1 may be distant from each other and communicate over a network. For example, the storage subsystem 403 may be a SAN that is distant from the host server 401, and they may communicate over a network. Likewise, in some embodiments the storage subsystem 403 may communicate with the cloud storage subsystem 404 over a network, and the cloud storage subsystem 404 may communicate with the remote server 402 over a network. In some embodiments, the remote server 402 may be a central hub from which the host server 401 can establish a communication connection, such as in a client-server networking model. Alternatively, the remote server 402 and host server 401 may be configured in any other suitable networking relationship (e.g., in a peer-to-peer configuration or using any other network topology).

In some embodiments, the network can be implemented using any number of any suitable communications media. For example, the network may be a wide area network (WAN), a local area network (LAN), an internet, or an intranet. In certain embodiments, the host server 401 and the storage subsystem 403 may be local to each other, and communicate via any appropriate local communication medium. For example, the host server 401 and the storage subsystem 403 may communicate using a local area network (LAN), one or more hardwire connections, a wireless link or router, or an intranet. In some embodiments, the various components in the computing environment 400 may be communicatively coupled using a combination of one or more networks and/or one or more local connections. For example, the host server 401 may be hardwired to the storage subsystem 403 (e.g., connected with an Ethernet cable), while the storage subsystem 403 may communicate with the cloud storage subsystem 404 using the network (e.g., over the Internet).

In some embodiments, the network can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network.

Figure 5:
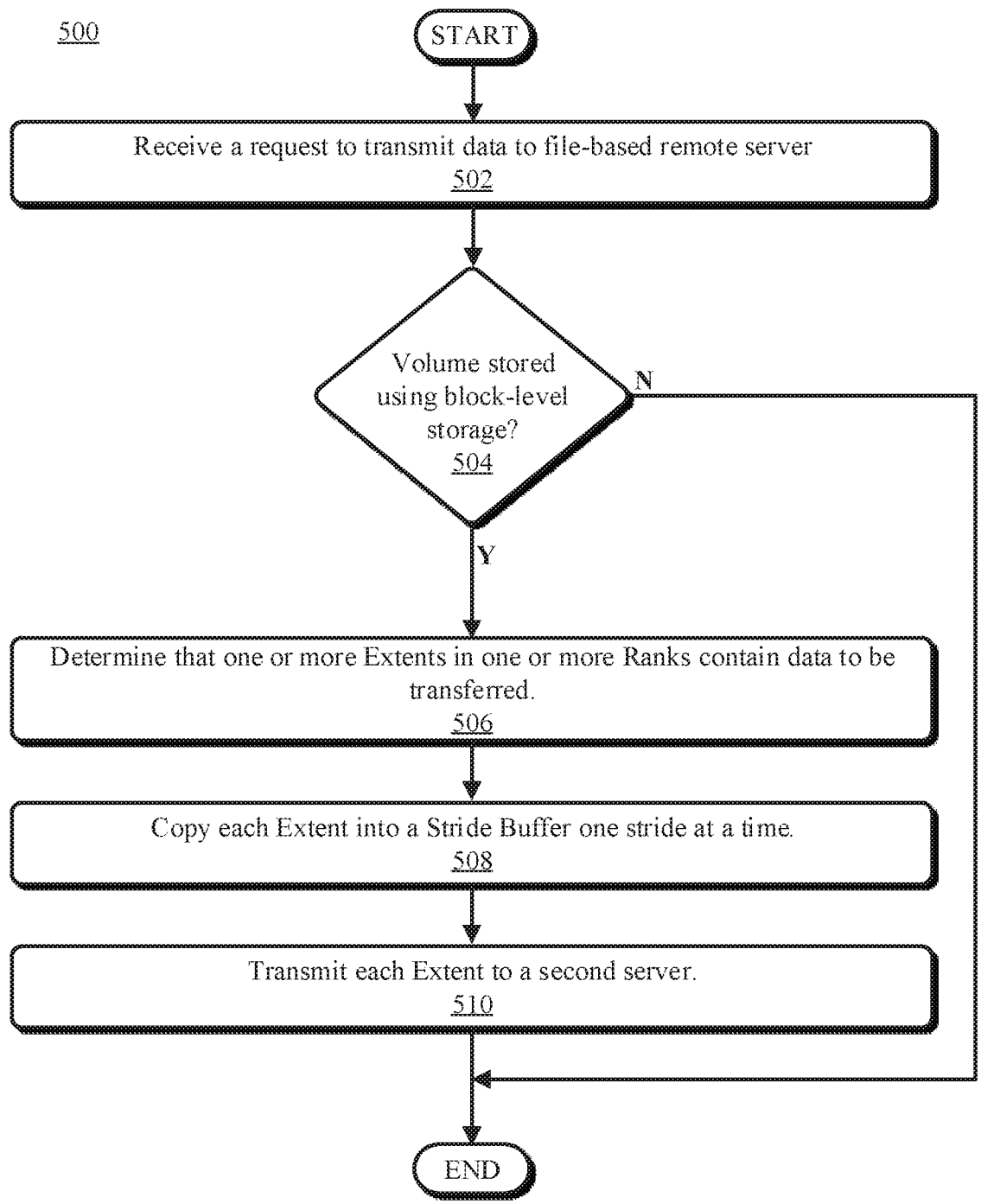
FIG. 5 illustrates a flowchart of an example method for transferring data stored in a block storage system to a file-based storage system, in accordance with embodiments of the present disclosure.

Referring now to FIG. 5, shown is a flowchart of an example method 500 for transferring data stored using block-level storage to a file-based storage system, in accordance with embodiments of the present disclosure. The method 500 may be performed by a computer system (e.g., by software or hardware in a host server or in a storage server such as storage subsystem 402 in FIG. 4). In some embodiments, one or more operations of the method 500 may be performed by a user, or by the computer system in response to user input. The method 500 may begin at operation 502, where the computer system may receive a request to transmit a logical volume (e.g., data) to a file-based remote server.

As used herein, a volume, or logical volume, includes a single accessible storage area. For example, a logical volume may be a portion of a RAID array that is independently mountable by an operating system. A volume may be made up of a set of extents. A volume that includes fixed block extents may be called a logical unit number (LUN), whereas a volume that includes count key data (CKD) extents may be called a CKD volume.

In some embodiments, the computer system may receive the request to transmit the volume from a user of a host server (e.g., host server 401 shown in FIG. 4). In other embodiments, the request may originate from the file-based remote server (e.g., remote server 402). For example, the file-based remote server may query data from the host server. In some embodiments, the query may be retrieved by the host server (e.g., host server 401 in FIG. 4), which may forward the query (e.g., after approving the transfer) to the storage subsystem (e.g., storage subsystem 402 in FIG. 4). In other embodiments, the remote server may query the storage subsystem directly.

After receiving the request to transmit the logical volume at operation 502, the computer system may determine whether the requested data is stored using block-level storage at decision block 504. For example, the computer system may determine that the data is stored using block-level storage if the request includes a small computer system interface (SCSI) call to a particular address. In some embodiments, the computer system may identify whether a shared-disk filesystem is installed on the storage subsystem (e.g., a filesystem installed on top of a SAN).

In some embodiments, the computer system may determine that the storage subsystem uses file-level storage, but that the file-level storage is not configured to allow for metadata formatting. This may be because the filesystem is configured to disallow (e.g., block) the storage subsystem from retrieving the metadata, because the metadata is never created, or because the metadata is otherwise not currently available (e.g., due to a faulty communication connection or because it has become corrupted). In these embodiments, the computer system may treat the data as if it were stored using block-level storage.

If the computer system determines that the requested data is stored using file-level storage at decision block 504, the method 500 may end. Otherwise, after determining that the requested data is stored using block-level storage at decision block 504, the computer system may determine which extents include data for the one or more volumes to be transferred at operation 506.

In some embodiments, the request may include a set of logical block addresses (LBAs) that correspond to the data requested. For example, the request may include a field that includes a one or more ranges of LBAs, referred to herein as volume ranges, to transfer. The computer system may then map the LBAs into their respective rank and extent ranges. In other embodiments, the request may simply identify the volume (or file, in the event that a filesystem is installed on the SAN) that is to be transferred. Metadata stored on the storage subsystem may be used to determine which LBAs are associated with the identified volume. In some embodiments, the metadata used to link LBAs to a selected volume may reside on the host server, and the computer system (e.g., storage subsystem) may query the host server for the required information. The computer system may then map the identified volume to its associated rank and extent ranges. In some embodiments, the metadata may link the volume directly to its associated rank and extent ranges.

After determining which extents include data for the one or more volumes to be transferred at operation 506, the computer system may copy each identified extent into a stride buffer at operation 508. The stride buffer, also referred to herein as the buffer copier, may be used to copy data (e.g., read/write) to/from a remote storage system (e.g., to/from the cloud). The stride buffer may include two buffer mechanisms: one for copying data out (e.g., to the cloud), one for copying data in (e.g., from the cloud to the storage subsystem).

In some embodiments, the computer system may copy the extents into the stride buffer one stride at a time. For example, the computer system may determine that a particular extent includes data of the volume being transferred. The computer system may determine that the particular extent is made up of multiple strides. The computer system may then copy each stride into the stride buffer one stride at a time until the entire extent is in the stride buffer.

After copying each identified extent into a stride buffer at operation 508, the computer system may transmit the extents stored in the stride buffer to the file-based server at operation 510. A file, referred to herein as a Block Extent File (BEF), may be generated in the storage subsystem for the file-based remote server for each extent transferred over. For example, if five extents are transferred to a cloud-based server, five BEFs may be generated in the cloud container associated with the cloud-based server. Each BEF may store the data for one of the five extents transferred over.

In some embodiments, the computer system may transfer the identified extents one extent at a time. For example, a volume selected to be transferred to a cloud-based server may include ten extents. The computer system may copy the first extent into the stride buffer one stride at a time. When every stride that makes up the first extent is in the stride buffer, the strides may be combined into a single BEF (e.g., by logic on/in the storage subsystem for the host server), which may be transferred to the cloud container. After the first BEF that corresponds to the first extent is transferred, the stride buffer may be emptied and the second extent may be copied into the stride buffer one stride at a time. The process may continue until each extent has been copied into the stride buffer, combined into a BEF, and transferred to the cloud container. Logic stored on the cloud container may then write the received BEFs to physical storage drives (e.g., to HDDs or SSDs). After transmitting the extents stored in the stride buffer to the file-based server at operation 510, the method 500 may end.

In some embodiments, the file-based server may generate a Master Volumes Table File (MVTF) when one or more volumes are selected to be transferred. The MVTF may be a special node (e.g., a table) that stores information (e.g., metadata) for all of the volumes that are being transmitted to the file-based server. The MVTF may include an entry for each volume transferred. In some embodiments, the file-based server may also generate Volume Extent Meta Files (VEMFs) for each volume. Each VEMF may store information (e.g., metadata) relating to a particular volume. Each entry in a VEMF for a particular volume may correspond to a BEF associated with the particular volume. The metadata stored in the MVTF and VEMF may include, among other things, the file/object name(s), size(s), access control list(s), and an identification of the rank and extent from which the data was copied.

The MVTF(s) and VEMF(s) may be updated as each volume (or extent) is transferred into the cloud container. In some embodiments, the file-based server may query the host server for the metadata information of the volumes in order to update the MVTF(s) and VEMF(s). In embodiments where the file-based server updates the data for the volume, the file-based server may generate new metadata for the volume and store the new metadata in the MVTF(s) and VEMF(s).

In some embodiments, the volume that was transferred to the file-based server may be restored to its original server. For example, the volume may have been transferred so that a specialized cloud-based application could process the data. Once the data processing has been completed, the updated data (and any new data generated during the processing) may be returned to the server from which it came (e.g., the host server). When a volume is restored from the cloud to a host server, the host server (or its storage subsystem, such as a SAN) may search the VEMF for the restored volume to map the BEFs into the correct extents within a rank. The cloud server may then transfer the volume through the stride buffer and into the host storage subsystem. The host storage subsystem may then write the data back to its associated extents.

Figure 6A:
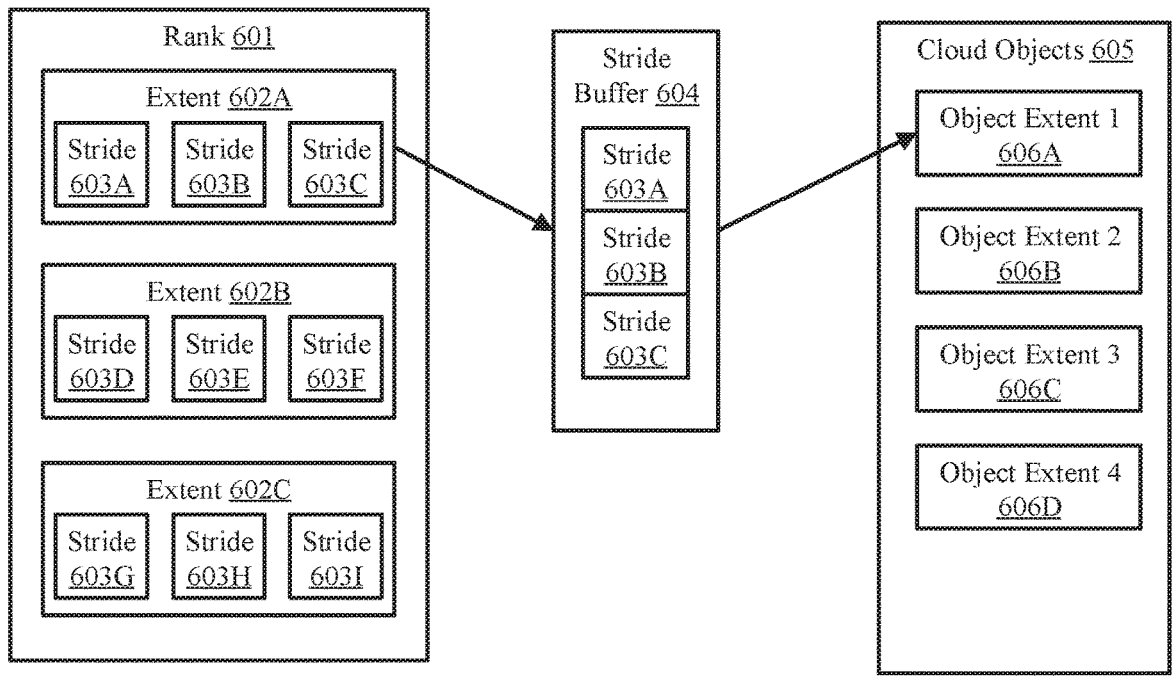
FIG. 6A illustrates a block diagram of a migration data flow for transmitting data from a block storage system to a file-based storage system, in accordance with embodiments of the present disclosure.

Referring now to FIG. 6A, shown is a block diagram of a migration data flow 600 for transmitting data from a block storage system (e.g., a storage system using block-level storage) to a file-based storage system, in accordance with embodiments of the present disclosure. The rank 601 may be a RAID array of physical storage drives, such as hard-disk drives (HDDs) and/or solid-state drives (SSDs). The rank 601 can have any RAID level (e.g., RAID 0, RAID 1, RAID 6), depending on the needs of the user.

The available space on each rank is divided into extents. The extents are the building blocks of the logical volumes. The characteristic of the extent is its size, which depends on the specified device type when defining a rank. For example, the rank 601 may be made up of one or more extents 602A-C. Extents, as used herein, may be evenly sized blocks of a rank. Extents can have any size (e.g., 16 MB, 1 GB), and the size of the extents may be user-configurable. Each extent 602A-C may include multiple strides 603A-I. A stride, also known as a stripe, is made up of one or more strips. Specifically, a stride may include one strip from each physical drive (e.g., HDD or SSD) located in the rank. A strip is the total amount of data written to a particular physical drive in the rank 601 before the next physical drive is written to.

For example, a user may write a 300 MB file to a rank that has 2 physical drives. The rank may be set up such that every strip is 100 MB (e.g., the file is written in 100 MB blocks). In this example, a stride may be 200 MB in size because each strip is 100 MB in size and there are two drives in the rank. The first 100 MB block may be written to the first drive in the rank. After the first 100 MB block is written to the first drive, the second 100 MB block may be written to the second drive. Finally, the third 100 MB block may be written to the first drive. While each extent 602A-C shown in FIG. 6A includes three strides (e.g., extent 602A includes strides 603A-C), extents may include any number of strides.

When a volume is scheduled to be transferred to a remote server (e.g., to a cloud container), the computer system may identify each extent that contains data for the volume. The computer system may then copy each stride for the identified extents (e.g., the extents that are being copied) into the stride buffer 604. For example, as shown in FIG. 6A, the first extent 602A of the rank 601 is copied into the stride buffer 604 one stride at a time. The stride buffer 604 may then merge the strides into a single object for each extent, also known as a block extent file (e.g., object extents 1-4 606A-D), and copy them into a cloud object container 605. Alternatively, in some embodiments, the logic for combining the strides into an object may be in the remote server, the host server, or elsewhere within the storage subsystem (e.g., as a component distinct from the stride buffer).

Figure 6B:
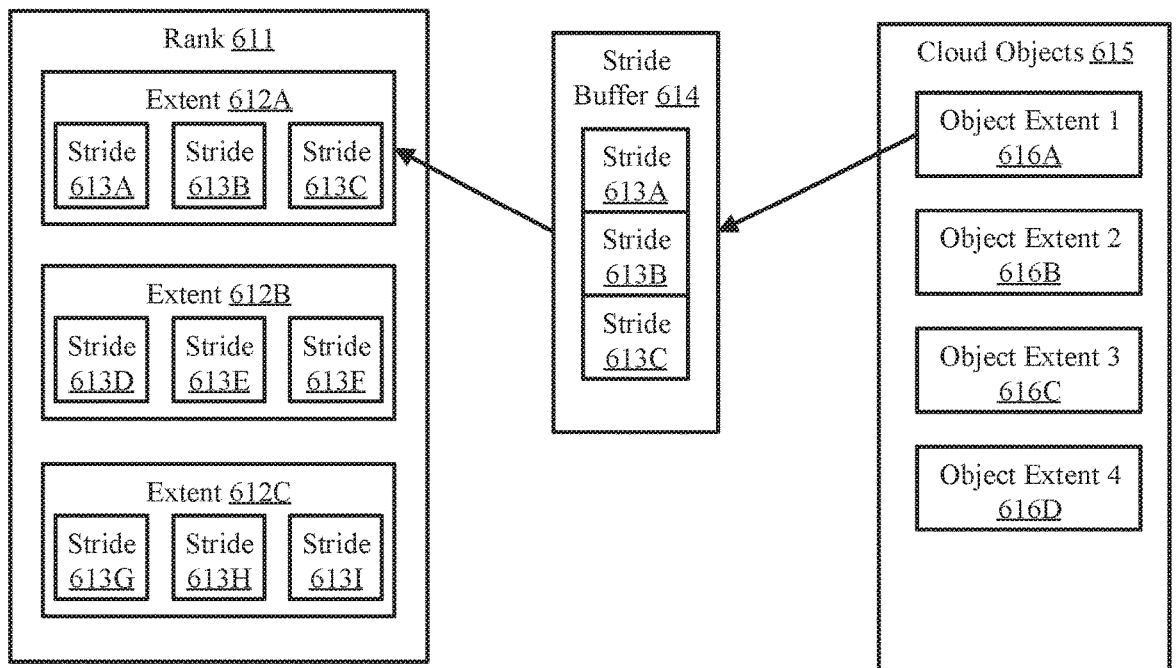
FIG. 6B illustrates a block diagram of a migration data flow for restoring the data from the file-based storage system to the block storage system, in accordance with embodiments of the present disclosure.

Referring now to FIG. 6B, shown is a block diagram of a migration data flow 610 for restoring the data from the file-based storage system to the block storage system, in accordance with embodiments of the present disclosure. The rank 611, stride buffer 614, and cloud object container 615 may be substantially similar to, or the same as, the rank 601, stride buffer 604, and cloud object container 605 discussed in reference to FIG. 6A.

The migration data flow 610 may restore objects from the cloud container 615 through the stride buffer 614 to the rank 611. One or more of the object extents 616A-D may be selected to be restored to the rank 611. For example, the data stored in the rank 611 may be transmitted to a cloud-based server for processing. After the data has been processed, the updated data may be returned to the server that sent it (e.g., returned to the host server that stores data in the rank 611). The remote server may use metadata for each block extent file (e.g., metadata saved in a VMTF, VEMF, or saved within the object itself) to map the objects 606A-D into their respective locations in the rank 611. In other words, the remote server may identify which strides 613A-I to store the data in based on the location of the corresponding data prior to it having been transmitted to the cloud server (e.g., the remote server).

After identifying where the data is to be stored, the data for each object extent 616A-D may be copied to the stride buffer 614. The data may be transmitted stride by stride according to the metadata. The strides may then be copied from the stride buffer 614 back into the rank 611. Because each object extent 616A-D contains data for a particular extent 612A-C in the rank 611, the storage subsystem that contains the stride buffer 614 and rank 611 may first identify which extent 612A-C to store the strides in, and then it may copy the strides from the stride buffer 614 to the corresponding extent 612A-C.

For example, the remote server may restore the first object extent 616A, as shown in FIG. 6B. The remote server may use the MVTF and VEMF for the transferred volume to determine which extents and strides (e.g., strides 613A-C) make up object extent 1 616A. The remote server may then copy the strides 613A-C for Object Extent 1 616A into the stride buffer 614. The strides 613A-C may then be restored back into the first extent 612A in the rank 611.

Figure 7:
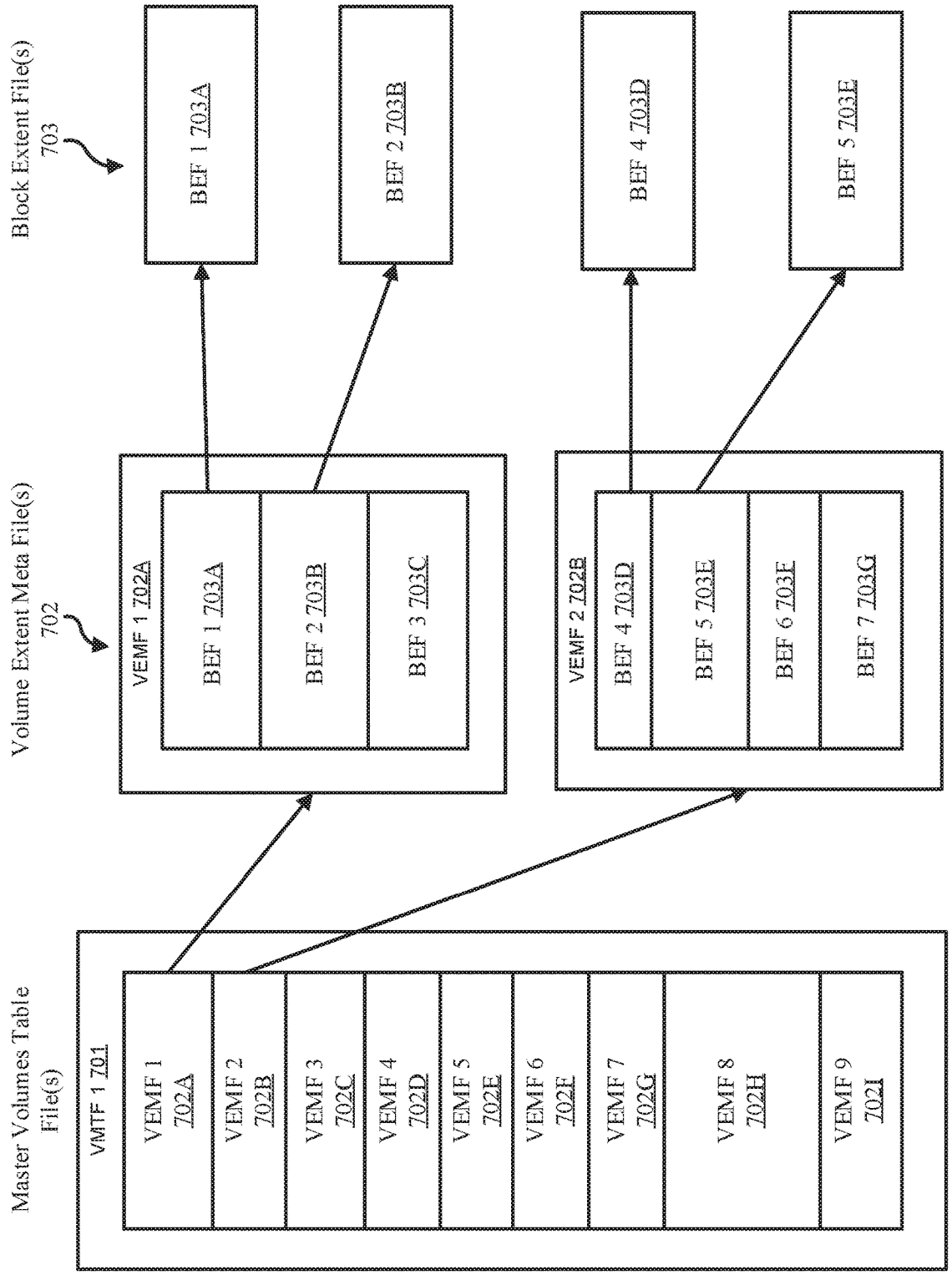
FIG. 7 illustrates the relationship between the master volume table files, the volume extent meta files, and the block extent files that may be generated when transferring data from a block storage system to a file-based storage system, in accordance with embodiments of the present disclosure.

Referring now to FIG. 7, shown is the relationship between the master volume table file(s) 701, the volume extent meta file(s) 702, and the block extent file(s) 703 that may be generated when transferring data from a block storage system to a file-based storage system, in accordance with embodiments of the present disclosure.

In some embodiments, the cloud object container (e.g., cloud storage subsystem 404, shown in FIG. 4) may generate a Master Volumes Table File (MVTF) 701 when a data migration is started. The MVTF 701 may be a special node (e.g., a table) that stores information (e.g., metadata) for all of the volumes that are being transmitted to the cloud server. The MVTF 701 may include an entry for each volume transferred. Each entry may be a Volume Extent Meta File (VEMF), which stores information (e.g., metadata) relating to a particular volume. For example, the VMTF 701 shown in FIG. 7 includes nine VEMFs 702A-I, collectively referred to as the VEMFs 702.

Each VEMF 702 may be created for a particular volume that is being transferred. In other words, each logical volume transferred to the cloud server may have a corresponding VEMF 702. In some embodiments, the VEMF 702 for a particular volume may be created when the transferring of the particular volume begins. The VEMFs 702 may include information (e.g., metadata) relating to one or more objects, also referred to as block extent files (BEFs), created in the cloud object container for the transferred volumes. For example, the first VEMF 702A may include information relating to three BEFs 703A-C that make up a first transferred volume. Likewise, the second VEMF 702B may include information relating to four BEFs 703D-G that make up a second transferred volume.

The metadata stored in the MVTF and VEMF may include, among other things, the file/object name(s), size(s), access control list(s), and an identification of the rank and extent from which the data was copied. When a volume is restored from the cloud to a host server, the host server (or its storage subsystem, such as a SAN) may search the VEMF for the restored volume to map the BEFs into the correct extents within a rank.

In some embodiments, the MVTF(s) and VEMF(s) may be generated by the host server (e.g., host server 401 in FIG. 4), or its storage subsystem (e.g., storage subsystem 403 in FIG. 4). The host server may then transmit the MVTF(s) and VEMF(s) as part of the data migration. For example, the host server may generate the MVTF(s) and VEMF(s) for each volume selected to be transferred prior to transferring any data. The host server may then send the MVTF(s) and VEMF(s) to the remote server, where they may be updated as necessary during the file transfer process.

Figure 8:
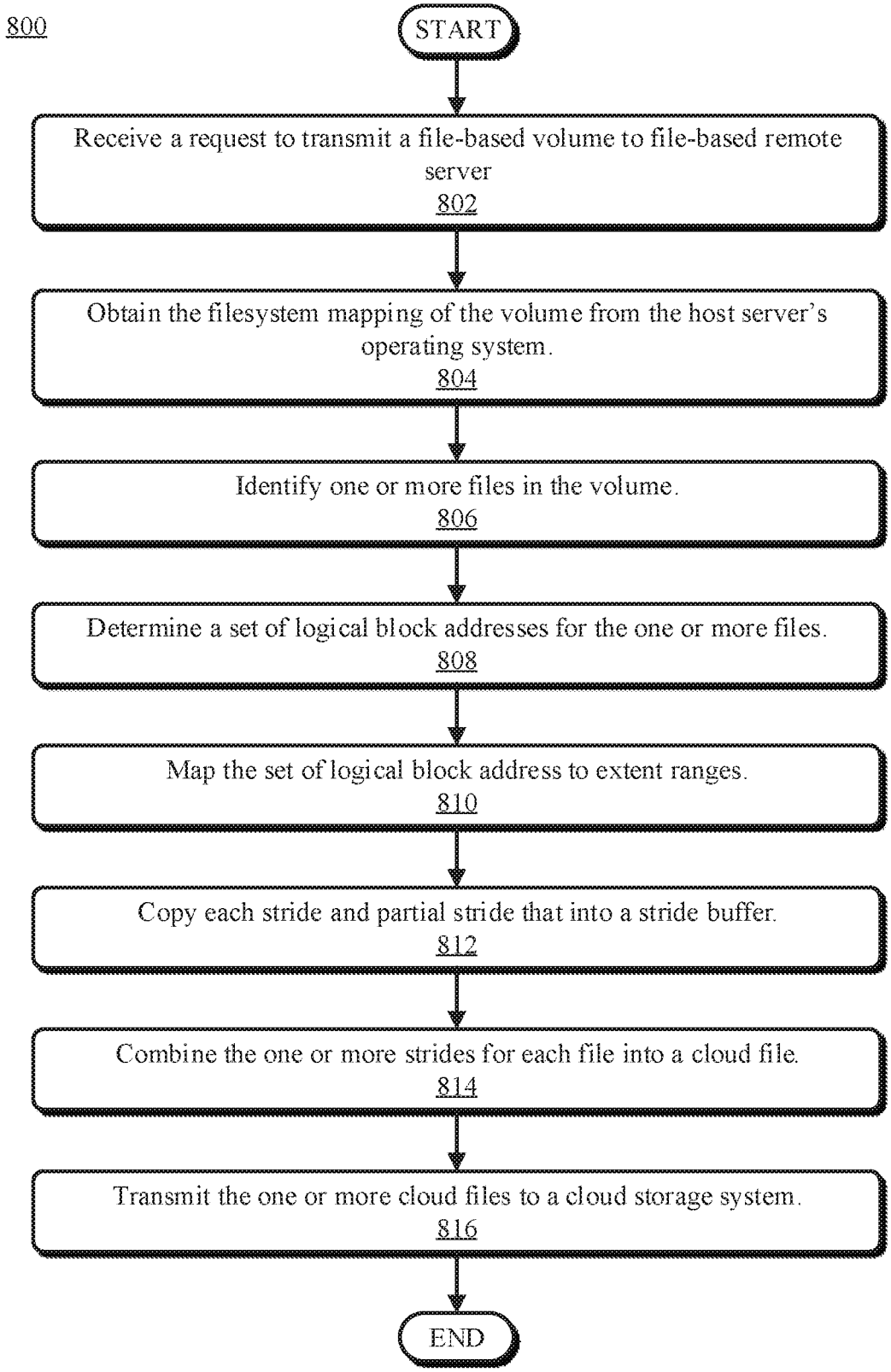
FIG. 8 illustrates a flowchart of an example method for transferring data stored in a file-based storage system to a remote file-based storage system, in accordance with embodiments of the present disclosure.

Referring now to FIG. 8, shown is a flowchart of an example method 800 for transferring data stored in a file-based host storage system to a remote file-based storage system, in accordance with embodiments of the present disclosure. The method 800 may be performed by a computer system (e.g., by a SAN or other storage subsystem, such as storage subsystem 403 in FIG. 4). In some embodiments, one or more operations of the method 800 may be performed by a user, or by the computer system in response to user input. The method 800 may begin at operation 802, where the computer system may receive a request to transmit a logical volume stored in a file-based host storage system to a file-based remote server.

In some embodiments, the file-based storage system may be a shared-disk file system. In other words, the file-based storage system may be a SAN that has a filesystem installed on top of it. As discussed herein, the file-based storage system may store data in one or more ranks (e.g., RAID arrays). Each rank may include one or more extents, which may be made up of one or more strides.

In some embodiments, the computer system may receive the request to transmit the volume from a user. In other embodiments, the request may originate from the file-based remote server. For example, the file-based remote server may query data from the host server. In some embodiments, the query may be retrieved by the host server (e.g., host server 401 in FIG. 4), which may forward the query to the storage subsystem (e.g., storage subsystem 402 in FIG. 4). In other embodiments, the remote server may query the storage subsystem directly.

After receiving the request to transmit data stored in a file-based host storage system to a file-based remote server at operation 802, the computer system may obtain the filesystem mapping of the volume from the host operating system at operation 804. As used herein, obtaining includes, but is not limited to, receiving, querying, retrieving, and generating. For example, in some embodiments the request may include the filesystem mapping. In other embodiments, the computer system may query the host server to obtain the filesystem mapping.

After obtaining the filesystem mapping of the volume from the host operating system at operation 804, the computer system may identify one or more files in the volume at operation 806. The computer system may analyze the filesystem mapping of the volume to identify the one or more files. In some embodiments, the computer system may extract metadata attributes (e.g., size, name, ACL settings) for each of the one or more files. The metadata attributes may be saved on the remote server for use by a file application or operating system on the remote server. Additionally, in some embodiments the filesystem mapping used to identify the one or more files may also be transmitted to the remote server.

After identifying one or more files in the volume at operation 806, the computer system may determine a set of logical block addresses (LBAs) for the one or more files at operation 808. In some embodiments, the computer system may use the obtained filesystem mapping to map the one or more files to the LBAs. In other embodiments, metadata stored on the storage subsystem may be used to determine a set of volume ranges (e.g., LBAs) for each file. In some embodiments, the request may include a set of logical block addresses (LBAs) that correspond to the files to be transferred. For example, the request may include a field that includes one or more ranges of LBAs for each file.

After determining a set of LBAs for the one or more files at operation 808, the computer system may map the set of logical block addresses to extent ranges at operation 810. Metadata stored on the storage subsystem may be used to determine the rank and extent ranges associated with the LBAs. In other words, the metadata may be used to isolate which ranks and extents to copy based on the LBAs.

After mapping the set of logical block addresses to extent ranges at operation 810, the computer system may copy each stride and partial stride that contains data of the one or more files into a stride buffer at operation 812. After copying each stride and partial stride that contains data of the one or more files into a stride buffer at operation 812, the computer system may combine the one or more strides for each file into a cloud file at operation 814. In some embodiments, the cloud file may be an object storage file, which may be data (e.g., a file) along with all its metadata, all bundled up as an object.

After combining the one or more strides for each file into a cloud file at operation 814, the computer system may transmit the cloud file(s) to a cloud storage system at operation 816. After receiving the cloud file(s), the cloud storage system may write the cloud file(s) to physical storage devices (e.g., HDDs and/or SSDs). In some embodiments, the remote server may generate a filesystem mapping of the cloud file(s) before or during the write operation. After transmitting the cloud file(s) to a cloud storage system at operation 816, the method 800 may end.

In some embodiments, the storage subsystem may transmit the strides individually or extent-by-extent to a cloud container (e.g., storage subsystem for the cloud server, such as cloud storage subsystem, 404 shown in FIG. 4), along with a table that includes information that allows the cloud container to combine the strides into a cloud object/file. The cloud container may include logic (e.g., software or hardware logic) that allows it to combine the strides and partial strides for a file into a single cloud object/file.

In some embodiments, the file-based server may generate a Master Volumes Table File (MVTF) when one or more volumes are selected to be transferred. The MVTF may be a special node (e.g., a table) that stores information (e.g., metadata) for all of the volumes that are being transmitted to the file-based server. The MVTF may include an entry for each volume transferred. In some embodiments, the file-based server may also generate Volume Extent Meta Files (VEMFs) for each volume. Each VEMF may store information (e.g., metadata) relating to a particular volume. Each entry in a VEMF for a particular volume may correspond to a BEF associated with the particular volume. The metadata stored in the MVTF and VEMF may include, among other things, the file/object name, size, access control list, and an identification of the rank and extent from which the data was copied.

The MVTF(s) and VEMF(s) may be updated as each volume (or extent) is transferred into the cloud container. In some embodiments, the file-based server may query the host server for the metadata information of the volumes in order to update the MVTF(s) and VEMF(s). In embodiments where the file-based server updates the data for the volume, the file-based server may generate new metadata for the volume and store the new metadata in the MVTF(s) and VEMF(s).

In some embodiments, the volume that was transferred to the file-based server may be restored to its original server (e.g., the host server). For example, the volume may have been transferred so that a specialized cloud-based application could process the data. Once the data processing has been completed, the updated data (and any new data generated during the processing) may be returned to the server from which it came (e.g., the host server). When a volume is restored from the cloud to a host server, the host server (or its storage subsystem, such as a SAN) may search the VEMF (or the filesystem mapping) for the restored volume to map the files into the correct extents within a rank. The cloud server may then transfer the volume through the stride buffer and into the storage subsystem. The storage subsystem may then write the data back to its associated extents.

In some embodiments, a user may request that one or more files be transferred to a cloud server, instead of an entire volume. In these embodiments, the computer system may skip operations 804 and 806 of method 800, and instead perform operations 808-816 directly after receiving the request.

Figure 9A:
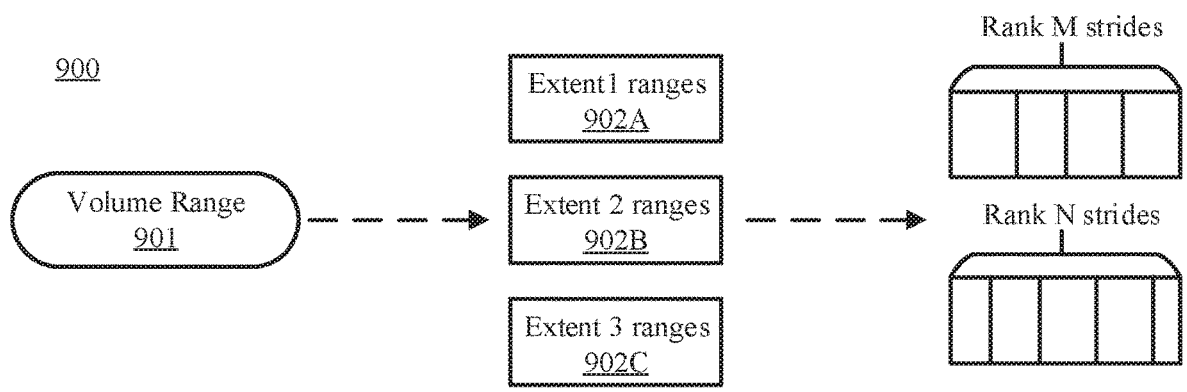
FIG. 9A illustrates an example flow diagram for mapping a volume range to strides, in accordance with embodiments of the present disclosure.

Referring now to FIG. 9A, shown is an example flow diagram 900 for mapping a volume range 901 to strides, in accordance with embodiments of the present disclosure. A computer system (e.g., a storage subsystem) may identify a volume range 901 to be mapped into one or more extent ranges 902A-C. The volume range 901 may be a range of logical block address (LBAs) for a logical volume, a file, or an object that is to be transferred. The storage subsystem may use a logic configuration volume segment table and/or a rank segment table to map LBAs to rank, extent, and stride ranges. In other words, a volume may be logical in that is it is made up of physical extents from many different RAID Arrays or Ranks (e.g., 8 physical disk drives that make up the RAID Array). The volume segment table and/or a rank segment table may be used to map the logical volume to physical locations on ranks and the extents on those ranks.

For example, the storage subsystem may identify the volume range 901 (e.g., LBA01254-LBA0381) as corresponding to three different extent ranges: extent 1 ranges 902A, extent 2 ranges 902B, and extent 3 ranges 902C. The computer system may then map the extent ranges 902A-C into particular stride addresses. In the example shown in FIG. 9A, the three extent ranges 902A-C include strides in two different ranks: Rank M and Rank N. For example, Extent 1 ranges 902A and Extent 3 ranges 902C could both refer to extents in Rank M, while extent 2 ranges 902B may refer to one or more extents in Rank N.

Figure 9B:
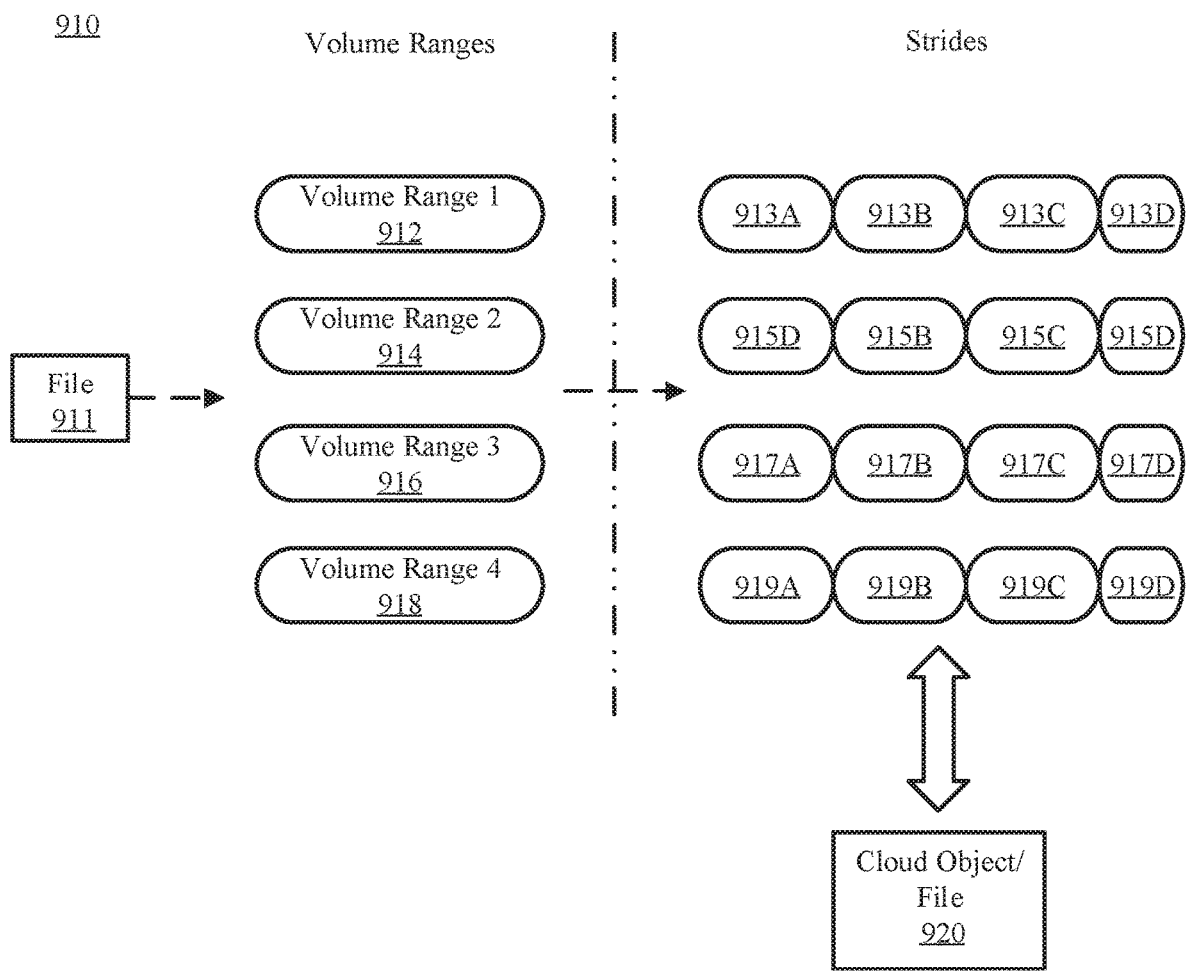
FIG. 9B illustrates an example flow diagram for transferring a file from a file-based storage system to a remote file-based storage system, in accordance with embodiments of the present disclosure.

Referring now to FIG. 9B, shown is an example flow diagram 910 of transferring a file 911 from a file-based storage system to a remote file-based storage system, in accordance with embodiments of the present disclosure. A computer system (e.g., storage subsystem 402 shown in FIG. 4) may receive a request to transfer the file 911 to a cloud container (e.g., cloud storage subsystem 404). The storage subsystem may query the host computer operating system for the system mapping of the file 911.

After obtaining the system mapping for the file 911, the storage subsystem may use the mapping to identify four volume ranges 912, 914, 916, and 918 for the file 911. In some embodiments, such as where the array that stores the filesystem has been defragmented, a file may only have one continuous range of LBAs. However, in some embodiments such as those where a filesystem has become fragmented, the file 911 may be associated with two or more LBA (e.g., volume) ranges.

After determining the set of volume ranges 912, 914, 916, and 918 for the file, the storage subsystem may determine which strides (and partial strides) correspond to the set of volume ranges, as discussed in FIG. 9A. For example, the storage subsystem may determine that strides 913A-C and partial stride 913D includes the LBAs associated with the first volume range 912. Likewise, strides 915A-C and partial stride 915D includes the LBAs associated with the second volume range 914, strides 917A-C and partial stride 917D includes the LBAs associated with the third volume range 916, and strides 919A-C and partial stride 919D includes the LBAs associated with the fourth volume range 918.

After determining which strides include information of the file 911, the storage subsystem may copy the strides and partial strides into a stride buffer, combine the strides into a single cloud object/file 920, and transmit the cloud object/file 920 to a cloud-based server. In some embodiments, the storage subsystem may transmit the strides individually or extent-by-extent to a cloud container (e.g., storage subsystem for the cloud server, such as cloud storage subsystem, 404 shown in FIG. 4), along with a table that includes information that allows the cloud container to combine the strides into a cloud object/file. The cloud container may include logic (e.g., software or hardware logic) that allows it to combine the strides and partial strides into a single cloud object/file 920.

Figure 10:
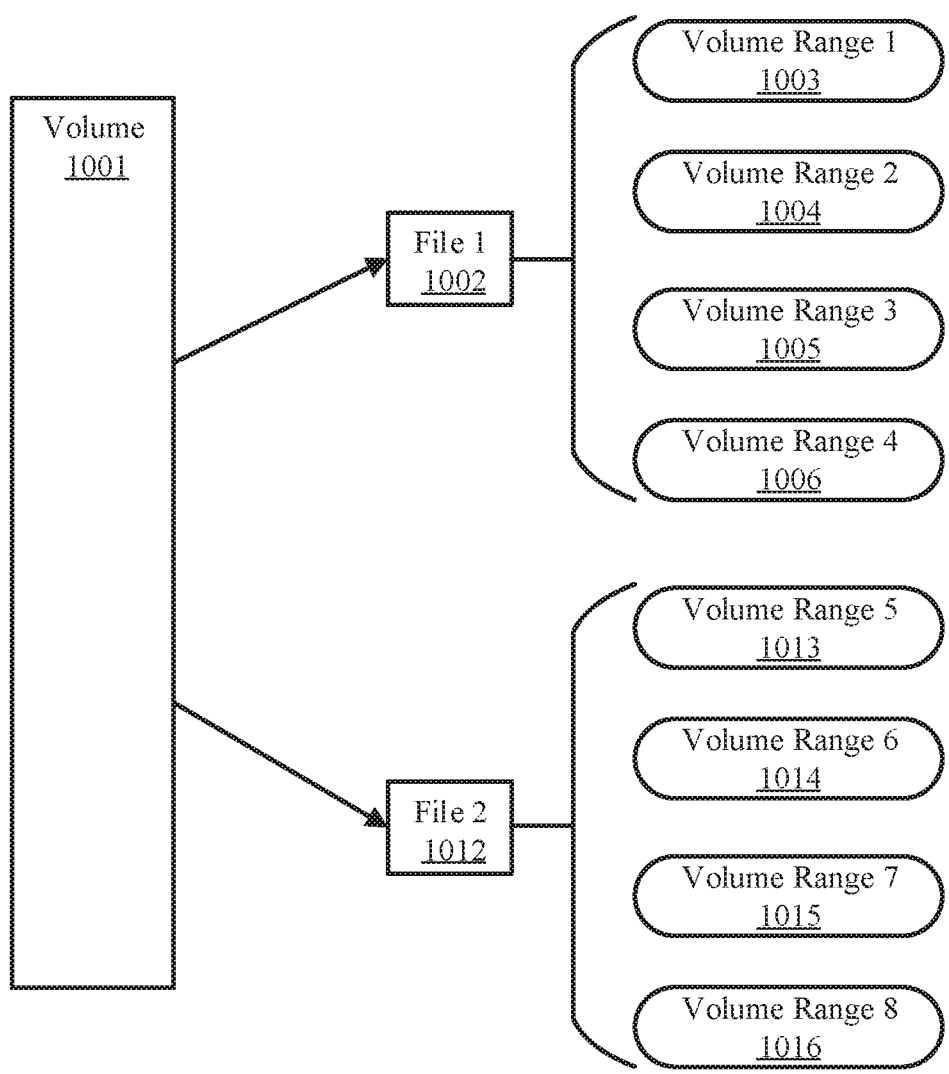
FIG. 10 illustrates an example method of mapping a volume that contains two files into a set of volume ranges, in accordance with embodiments of the present disclosure.

Referring now to FIG. 10, shown is an example flow diagram 1000 for mapping a volume 1001 that contains two files 1002 and 1012 into two sets of volume ranges, in accordance with embodiments of the present disclosure. A computer system (e.g., a storage subsystem 402 shown in FIG. 4) may receive a request to transfer the volume 1001 to a cloud container (e.g., cloud storage subsystem 404). The storage subsystem may query the host computer operating system for the filesystem mapping of the volume 1001.

Using the filesystem mapping of the volume 1001, the storage subsystem may determine that the volume 1001 contains two files: a first file 1002 and a second file 1012. As discussed herein, the storage subsystem may further identify a set of volume ranges (e.g., LBA ranges) for each file 1002 and 1012 in the volume 1001. For example, the computer system may use the filesystem mapping to determine that the first file 1002 is stored in volume ranges 1-4 1003-1006, while the second file 1012 is stored in volume ranges 5-8 1013-1016.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
receiving, by a remote server and from a host device, a request to restore data to the host device, wherein the data is stored by the remote server as one or more objects, each respective object corresponding to a respective extent of a logical volume that includes the data on the host device;
determining, using metadata for the one or more objects, a set of strides on the host device that corresponds to the one or more objects;
splitting each of the one or more objects into a set of data pieces using the metadata for the one or more objects, each data piece corresponding to a stride in the set of strides; and
transmitting each data piece from the remote server to the host device.

2. The method of claim 1, wherein transmitting each data piece from the remote server to the host device comprises transmitting each data piece to a stride buffer that is communicatively coupled to the host device.

3. The method of claim 1, wherein determining the set of strides on the host device that corresponds to the one or more objects comprises retrieving the metadata from a master volumes table file (MVTF), the MVTF being a node that stores information for each volume of the host device that has been transferred to the remote server.

4. The method of claim 3, the method further comprising:
receiving, from the host device, the MVTF.

5. The method of claim 3, the method further comprising:
generating the MVTF and a volume extent meta file (VEMF) for the logical volume in response to the logical volume being transferred to the remote server, wherein the VEMF for the logical volume includes metadata for each of the one or more objects;
processing data stored in at least one of the one or more objects;
modifying, in response to processing the data in the at least one object, the at least one object; and
updating, in response to modifying the at least one object, the metadata stored in the MVTF and VEMF based on the modifying.

6. The method of claim 5, wherein the generating the MVTF and the VEMF comprises:
querying the host device for a filesystem mapping of the logical volume;
receiving, from the host device, the filesystem mapping;

analyzing the filesystem mapping to identify one or more files in the logical volume; and extracting metadata attributes for the one or more files.

7. The method of claim 5, wherein the metadata stored in the MVTF and the VEMF includes file names, sizes, access control lists, and identifications of ranks and extents from which the logical volume was copied.

8. The method of claim 1, the method further comprising:

receiving, from the host device, the one or more objects to be processed by the remote server;

generating a filesystem mapping of the one or more objects prior to writing the one or more objects to a storage device communicatively coupled to the remote server;

storing the one or more objects on the storage device; and updating data stored in a particular object of the one or more objects by processing the one or more objects, wherein at least one data piece transmitted from the remote server to the host device includes the updated data.

9. A system comprising:

a memory; and a processor communicatively coupled to the memory, the processor being configured to perform a method comprising:

receiving, by a remote server and from a host device, a request to restore data stored by the remote server as one or more objects, each respective object corresponding to a respective extent of a logical volume that includes the data on the host device;

determining, using metadata for the one or more objects, a set of strides on the host device that corresponds to the one or more objects;

splitting each of the one or more objects into a set of data pieces using the metadata for the one or more objects, each data piece corresponding to a stride in the set of strides; and transmitting each data piece from the remote server to the host device.

10. The system of claim 9, wherein transmitting each data piece from the remote server to the host device comprises transmitting each data piece to a stride buffer that is communicatively coupled to the host device.

11. The system of claim 9, wherein determining the set of strides on the host device that corresponds to the one or more objects comprises retrieving the metadata from a master volumes table file (MVTF), the MVTF being a node that stores information for each volume of the host device that has been transferred to the remote server.

12. The system of claim 11, wherein the method performed by the processor further comprises:

generating the MVTF and a volume extent meta file (VEMF) for the logical volume in response to the logical volume being transferred to the remote server, wherein the VEMF for the logical volume includes metadata for each of the one or more objects;

processing data stored in at least one of the one or more objects;

modifying, in response to processing the data in the at least one object, the at least one object; and updating, in response to modifying the at least one object, the metadata stored in the MVTF and VEMF based on the modifying.

13. The system of claim 12, wherein the generating the MVTF and the VEMF comprises:

querying the host device for a filesystem mapping of the logical volume;

receiving, from the host device, the filesystem mapping;

analyzing the filesystem mapping to identify one or more files in the logical volume; and extracting metadata attributes for the one or more files.

14. The system of claim 9, wherein the method performed by the processor further comprises:

receiving, from the host device, the one or more objects to be processed by the remote server;

generating a filesystem mapping of the one or more objects prior to writing the one or more objects to a storage device communicatively coupled to the remote server;

storing the one or more objects on the storage device; and updating data stored in a particular object of the one or more objects by processing the one or more objects, wherein at least one data piece transmitted from the remote server to the host device includes the updated data.

15. A computer program product comprising a computer readable storage medium having program instructions embodied therewith, the program instructions executable by a processor to cause the processor to perform a method comprising:

receiving, by a remote server and from a host device, a request to restore data stored by the remote server as one or more objects, each respective object corresponding to a respective extent of a logical volume that includes the data on the host device;

determining, using metadata for the one or more objects, a set of strides on the host device that corresponds to the one or more objects;

splitting each of the one or more objects into a set of data pieces using the metadata for the one or more objects, each data piece corresponding to a stride in the set of strides; and transmitting each data piece from the remote server to the host device.

16. The computer program product of claim 15, wherein transmitting each data piece from the remote server to the host device comprises transmitting each data piece to a stride buffer that is communicatively coupled to the host device.

17. The computer program product of claim 15, wherein determining the set of strides on the host device that corresponds to the one or more objects comprises retrieving the metadata from a master volumes table file (MVTF), the MVTF being a node that stores information for each volume of the host device that has been transferred to the remote server.

18. The computer program product of claim 17, wherein the method performed by the processor further comprises:

generating the MVTF and a volume extent meta file (VEMF) for the logical volume in response to the logical volume being transferred to the remote server, wherein the VEMF for the logical volume includes metadata for each of the one or more objects;

processing data stored in at least one of the one or more objects;

modifying, in response to processing the data in the at least one object, the at least one object; and updating, in response to modifying the at least one object, the metadata stored in the MVTF and VEMF based on the modifying.

19. The computer program product of claim 18, wherein the generating the MVTF and the VEMF comprises:

querying the host device for a filesystem mapping of the logical volume;

receiving, from the host device, the filesystem mapping;
analyzing the filesystem mapping to identify one or more files in the logical volume; and
extracting metadata attributes for the one or more files.

20. The computer program product of claim 15, wherein the method performed by the processor further comprises:
receiving, from the host device, the one or more objects to be processed by the remote server;
generating a filesystem mapping of the one or more objects prior to writing the one or more objects to a storage device communicatively coupled to the remote server;
storing the one or more objects on the storage device; and
updating data stored in a particular object of the one or more objects by processing the one or more objects, wherein at least one data piece transmitted from the remote server to the host device includes the updated data.

* * * * *